United States Patent [19]

Kruse et al.

[11] Patent Number: 4,804,728

[45] Date of Patent: Feb. 14, 1989

[54] PROCESS FOR THE PRODUCTION OF PASTE-FORMING VINYL CHLORIDE POLYMERS

[75] Inventors: Wolfgang A. Kruse, Marl; Burkhard Boeke, Haltern, both of Fed. Rep. of Germany

[73] Assignee: Huels Aktiengesellschaft, Marl, Fed. Rep. of Germany

[21] Appl. No.: 888,654

[22] Filed: Jul. 23, 1986

[30] Foreign Application Priority Data

Jul. 23, 1985 [DE] Fed. Rep. of Germany ....... 3526251

[51] Int. Cl.$^4$ .............................................. C08F 2/24
[52] U.S. Cl. .................................... 526/209; 526/214; 526/225
[58] Field of Search .................. 526/209, 214, 225

[56] References Cited

U.S. PATENT DOCUMENTS

| | | | |
|---|---|---|---|
| 3,399,157 | 8/1968 | de S. Deex | 526/209 |
| 4,093,581 | 6/1978 | Anderson | 526/212 |
| 4,100,339 | 7/1978 | Konig et al. | 526/209 |
| 4,515,928 | 5/1985 | Schwarz | 526/200 |

Primary Examiner—Christopher Henderson
Attorney, Agent, or Firm—Millen & White

[57] ABSTRACT

A process for the production of paste-forming polymers of vinyl chloride by emulsion or microsuspension polymerization, utilizes as the auxiliary dispersant an alcohol glycol ether of the general formula

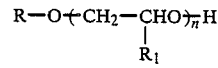

wherein R is an alkyl- or alkylene residue of 16–30 carbon atoms, $R_1$ is H or an alkyl residue of 1–2 carbon atoms, and n is a number from 1 to 3. It is also possible to employ the predispersion method. The polymers yield pastes of low viscosity and an almost Newtonian fluid characteristic, and final products exhibiting a high resistance to fogging.

20 Claims, No Drawings

PROCESS FOR THE PRODUCTION OF PASTE-FORMING VINYL CHLORIDE POLYMERS

BACKGROUND OF THE INVENTION

The preparation of polyvinyl chloride which is suitable for paste production, in accordance with either the continuous or discontinuous method of preparation, is known.

Use of the continuous method results in forming a paste PVC for plastisols which has a desired low viscosity in the high shear range, but a high viscosity at low shear rates. Also, the rise in paste viscosity per unit time is relatively high. Furthermore, these PVC compositions contain relatively high emulsifier concentrations. A high emulsifier concentration has undesirable effects on both the final PVC product and also on the preparation of the product.

The PVC compositions prepared in accordance with the discontinuous method can be polymerized by emulsion polymerization with markedly lower quantities of emulsifier, especially if the emulsifier is added according to the teachings of German Patent No. 1,964,029 or in accordance with the laid-open disclosure of Belgian Patent No. 656,985. In all instances, though, the plastisols which are produced in the aforementioned discontinuous methods exhibit a higher paste viscosity than those prepared by continuous polymerization.

It is also known to conduct vinyl chloride polymerization according to the so-called microsuspension method, as described, for example, in DAS No. 1,069,387. Even though processing by the spread coating method can be more difficult, due to the frequently occurring dilatancy of the pastes prepared with these types of PVC at higher shear gradients, still, the use of this paste polyvinyl chloride type is widespread. For stabilizing the microsuspension polymerization of the vinyl chloride monomers the use of long-chain alcohols has been disclosed, in addition to emulsifiers, for example in DOS No. 1,520,133. Other patent disclosures claim linear-chain aliphatic alcohols having a C atom range of 10 to 30. In many applications the lower homologs, such as $C_{10}$–$C_{14}$, are preferred since their melting point lies only slightly above room temperature and their handling as liquids requires only low energy expenditures. In contrast, the higher alcohols, starting with about $C_{14}$ with their melting points above 50° C., necessitate higher expenditures in energy and technology. However, the volatility of the lower homologs can be harmful in the finished plasticized polyvinyl chloride article. This volatility leads to "fogging", a name that has been coined by persons skilled in the art. Fogging is particularly undesirable when using PVC in automobile production since it can lead to a greasy, troublesome coating, for example, on the glass panes.

Organic compounds of low water but high VC solubility have been utilized as auxiliary dispersants in other discontinuous processes for vinyl chloride polymerization. Such embodiments are disclosed in:

DOS No. 2,850,105; DOS No. 2,742,178; EP No. 0,030,524; DOS No. 3,210,891; DOS No. 3,242,088 and German Patent Application No. P 33 43 766.1.

The polymerizations of the aforementioned cited six processes are performed with fatty alcohols as the auxiliary polymerizing component. The polymerization autoclave is charged with water, emulsifier, alcohol, optionally an initiator, and also additional conventional additives, and the mixture is heated under agitation to above the alcohol melting point. Before adding the vinyl chloride, the mixture is cooled, if required, to the polymerization temperature. Utilizing during this process a fatty alcohol which has a melting point markedly, e.g., about 10° C. above, the polymerization temperature, i.e., e.g. about 40° to 50° C., a paste polyvinyl chloride is obtained which is suitable as a high viscosity paste, as demonstrated by comparative Test A in the specification, infra. It would be desirable to employ long-chain fatty alcohols, e.g., $C_{20}$ up to $C_{30}$, on account of their lower volatility. However, the melting points of these alcohols lie significantly above the polymerization temperature ordinarily set for producing paste polyvinyl chloride. This means, for example, that in a paste PVC which has a K-value of 70, fatty alcohols up to about $C_{18}$ can be utilized. It is also possible to use alcohol mixtures of high-molecular and low-molecular fatty alcohols in order to lower the melting point. When raising the K-value of the polymer, the C chain length of at least part of the fatty alcohol component must be correspondingly shortened. These fatty alcohols, though, promote the undesirable fogging which is more pronounced, particularly at higher K-values. By using fatty alcohols, either alone or in a mixture, which have a melting point close to room temperature, a paste PVC is obtained suitable as a high-viscosity paste, as demonstrated by Comparative Test B, infra. This finding is pointed out in DOS No. 2,850,105, and it is also noted therein that the melting point of the auxiliary agent must not be substantially (10° C.) below the polymerization temperature in order to avoid high-viscosity pastes and low stability of the dispersions, especially for dispersions with solid content of 40–60%.

SUMMARY OF THE INVENTION

These and other drawbacks of the prior art have been overcome, in a process aspect, by a process for the production of paste-forming homopolymers of vinyl chloride or copolymers of mixtures of vinyl chloride with up to 30% by weight of copolymerizable monomers, by discontinuous polymerization in an aqueous emulsion or in aqueous microsuspension, in the presence of at least one water-soluble or monomer-soluble catalyst and of an emulsifier system comprising anionic emulsifier and auxiliary dispersant, the improvement comprising utilizing as the auxiliary dispersant an alcohol gylcol ether of the general formula

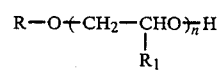

wherein R is a branched or straight chain alkyl, or alkylene moiety of 16–30 carbon atoms, $R_1$ is hydrogen or an alkyl moiaty of 1–2 carbon atoms, and n is a number of 1 to 3.

DETAILED DISCUSSION

It is possible to prepare a predispersion from the anionic emulsifier, the auxiliary dispersant, and at least a portion, e.g., about 5 to 100 %, preferably 10–100%, of the aqueous phase required for polymerization, and only then to add the remaining components. When using a monomer-soluble catalyst, a predispersion can be prepared from the anionic emulsifier, the auxiliary dispersant, the monomer-soluble catalyst, and at least a portion, e.g., about 5 to 100 % preferably 10–100%, of the aqueous phase needed for polymerization, and only then is the monomer added. In this case, the dispersion can be formed by means of a homogenizing machine. It is also possible to homogenize a mixture of the anionic emulsifier, the auxiliary dispersant, the catalyst, at least a portion, e.g., about 10 to 100 % of the aqueous phase needed for polymerization, and at least a portion, e.g., about 0 to 100 % of the monomer, with the use of a homogenizing machine. An additional process embodiment is to add a mixture of the anionic emulsifier, the auxiliary dispersant, and optionally water to the polymerization charge, either batchwise or continuously during the polymerizing period.

In another embodiment of the invention, the predispersion can be prepared with only about 30–80% by weight of the total amount of anionic emulsifier required, and added to the polymerization charge, while the remainder of the anionic emulsifier, or of a component forming the anionic emulsifier, e.g. potassium hydroxide, sodium hydroxide a the like, is added in metered amounts as an aqueous solution, either batchwise or continuously, to the polymerization mixture after a conversion of 10–60% by weight. In the generic formula describing the preferred class of auxiliary dispersants,

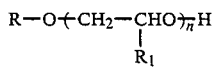

n is preferably either 1 or 2; R is preferably a straight-chain alkyl moiety of 18–22 carbon atoms, and $R_1$ is preferably hydrogen or a methyl group. R can also be an alkylphenyl moiety of 18–22 carbon atoms.

Suitable alcohols for forming the backbone of the auxiliary dispersants are, for example: cetyl alcohol, stearyl alcohol, oleyl alcohol, arachidyl alcohol, behenyl alcohol, lignoceryl alcohol and cerotyl alcohol. Stearyl alcohol, arachidyl alcohol, and behenyl alcohol are preferred. Mixtures of such alcohols are also suitable. The alcohols on which the glycol ethers are based can be reacted with 1–3 moles of ethylene oxide, 1,2-propylene oxide, or 1,2-butylene oxide according to conventional methods. Preferably, 1–2 moles of propylene oxide are utilized for the reaction. In particular, 1–2 moles of ethylene oxide are utilized for the reaction with the basic alcohol. It is known to those skilled in the art that in such a reaction, a Poisson distribution results, i.e., after the reaction of an alcohol with, for example, 2 moles of ethylene oxide, there are also formed certain smaller proportions of glycol ethers exhibiting both higher and lower degrees of oxethylation, as well as unreacted alcohols. The degree of oxalkylation, i.e., n in the general formula for the alcohol glycol ethers, always represents the number of moles of alkylene oxide utilized for reaction with one mole of the alcohol.

The alcohol glycol ethers to be used as the auxiliary dispersants are added in an amount from 0.05–2.5 preferably 0.1–2.0% by weight based on monomer.

Suitable anionic emulsifiers are the anionic surfactants listed in Ullmanns Encyklopedie der technischen Chemie 22: 455 et seq. (1982). These include, for example, alkali metal or ammonium salts of fatty acids, of alkylsulfonic acids, alkylarylsulfonic acids, sulfosuccinic acid esters, or fatty alcohol sulfates which should be utilized in quantities of 0.2–3.0% by weight, preferably 0.5–1.5% by weight, based on the monomer.

The process of this invention makes it possible to produce latices having a solids content of up to about 60% by weight without appreciable formation of undesirable coagulates. The viscosity of the pastes of polyvinyl chloride obtained is low, and the pastes have an almost Newtonian fluid type behavior. Finished articles obtained from this paste PVC exhibit an especially low fogging measured as a high gloss of $\geq 80$ (according to the testing procedure described below The melting point of the auxiliary dispersants can be more than 10° C. below the polymerization temperature without any negative effect on the stability of the dispersions or the paste viscosities. Also, in this case, the polymerization temperature can be immediately set during the dispersing step without requiring additional energy and time for melting the alcohol and cooling to the polymerization temperature.

According to the process of this invention, after completion of polymerization, a latex is obtained which has a solids content of up to 60%. The anionic emulsifier and the auxiliary dispersant can be dispersed in water, thus forming a predispersion. In the case where a monomer-soluble initiator is selected for the polymerization, the initiator can, similarly, be added to the mixture. If the melting points of the polyglycol ethers range above room temperature the dispersing step is preferably performed at temperatures above the melting point of the polyglycol ether. If necessary, the polymerization temperature can be set after adding the vinyl chloride. The dispersing step can also be carried out by homogenizing machines known to those in the art. Homogenization can be conducted both before and after addition of vinyl chloride. The emulsifier or emulsifier mixture can be added either continuously or batchwise during the polymerizing period, as described in DOS Nos. 3,210,981. Also in apportioned addition, e.g. about 30 to 80%, of the pure emulsifier can be added in metered quantities according to German Patent Application No. P 33 43 766.1. The volatility of the glycol ethers intended as auxiliary dispersants is substantially lower as compared to that of the basic alcohols. At the same time, by alkoxylation of the alcohols, the melting point can be lowered markedly below the polymerization temperature required for producing high-molecular weight paste polyvinyl chloride. Typical melting points are 20°–45° C. When setting the claimed alkoxylation degrees wherein n in the formula ranges from 1–3, a portion of the alcohol employed may remain unreacted in the reaction mixture, and can be removed by distillation. The advantage of lowering the melting point and reducing volatility, however, remains preserved if the undistilled reaction mixture as such is directly utilized.

It is especially surprising that PVC products are obtained by the process of the invention which can be processed into low-viscosity pastes, since the patent literature (DOS No. 2,742,178, page 10, lines 9–11) warns against the use of alkoxylated alcohols, and although the water solubility of the basic alcohols is increased by the alkoxylation. It is equally surprising that their potency as auxiliary dispersants remains intact even when the melting point, due to alkoxylation, lies more than 10° C. below the polymerization temperature. Another suprising fact is that despite the introduction of methyl side chains in alkoxylation with propylene oxide, the excellent properties of the compounds as auxiliary dispersants remains intact.

The use of nonionic emulsifiers from the class of alkoxylated alcohols besides anionic emulsifiers, especially in the production of copolymers of vinyl chloride, has already been disclosed, e.g., in U.S. Pat. No. 3,399,157 or German patent No. 2,604,630. However, the disclosed nonionic emulsifiers are in all cases products having hydrophilic lipophilic balance (HLB) values in excess of 10. Substantially higher alkoxylation degrees are necessary for this purpose (10-20) than the ones claimed herein. Also, these highly alkoxylated products are not effective as auxiliary dspersants but rather result, in the process versions described, in instabilities during polymerization at the indicated concentrations and impair the thermal stability of the polyvinyl chloride. The alkoxylated alcohols utilized in accordance with this invention are not oil-in-water emulsifiers.

When selecting a suitable monomer-soluble initiator, care must be taken that this initiator will not suffer marked disintegration during the dispersing step. Preferably, initiators are used which, at the required dispersing temperature, exhibit half-life values greater than 10 hours, and most preferably, greater than 20 hours. When an initiator which has a large half-life value is chosen, on account of the high melting point of the alkyl glycol ether employed, the subsequent polymerization reaction should be controlled by means of suitable reducing agents. Suitable reducing agents are described in the monograph of Kainer, "Polyvinylchlorid und Vinylchlorid—Mischpolymerisate" Springer Publishers, 1965, page 46 to 50.

Except for the amount of water required for the possible metered feeding of emulsifier systems and also, if desired, the activator as reducing agent, the total amount of water needed for polymerization can be introduced into the reactor together with the preparation of the predispersion. Buffer salts can be added to the water; for example, sodium pyrophosphate, sodium acetate, sodium borate and the like.

Suitable comonomers include vinyl acetate, vinylidene chloride, vinyl ethers, acrylonitrile, acrylic acid, esters, maleic acid mono- and diesters and the like. The comonomer can be present in the copolymer in an amount of up to 30% by weight, preferably between 1 and 20% by weight. The ratio of monomer to water can vary widely, including up to very high vinyl chloride concentrations (about 1:0.5 to 1:1.6 monomer to water). In general, it is desired to perform the polymerization so that latices are obtained having as high a solids content as possible; for example, 50-60% by weight. Of course, final conversion should be as high as possible.

The conventional per compounds can be utilized as the water-soluble catalysts, such as $H_2O_2$, potassium persulfate and the like, as well as the redox systems, as indicated, for example, in Kainer, "Polyvinylchlorid und Vinylchlorid-Mischpolymerisate" [Polyvinyl Chloride and Vinyl Chloride Copolymers], Springer Publishers, 1965, pages 46 et seq.

It is also possible, considering the respective dispersing and homogenizing temperature, to use monomer-soluble initiators and, if necessary, i.e., the reducing agents conventionally employed for a redox reaction. Examples for monomer-soluble initiators include azo compounds, such as azobisisobutyronitrile, 2,2'-azo-bis (2,4-dimethylvaleronitrile); or peroxides, such as dicyclohexyl peroxydicarbonate, di-n-butylperoxydicarbonate, dicetyl peroxydicarbonate, dilauroyl peroxide, dibenzoyl peroxide, dipropionyl peroxide, tert-butyl-peroxy-2-ethylhexanoate, tert-butyl-peroxybenzoate, cumyl hydroperoxide and tert-butyl hydroperoxide.

Suitable reducing agents include sodium thiosulfate, sodium formaldehyde sulfoxylate, ascorbic acid, isoascorbic acid, and sodium borohydride.

The initiators can be added in amount of 0.005-0.5% by weight, preferably 0.01-0.1% by weight, based on the monomer.

The polymerization temperature—depending on the desired molecular weight—can be about 35°-70° C. The duration of polymerization is, as always, dependent on the polymerization temperature and the catalyst concentrations and can be from about 4 to 16 hours.

Agitation of the mixture should suitably be carried out at the conventional peripheral speeds, preferably with the paddle or impeller agitators customarily employed in emulsion or microsuspension polymerization methods.

Without further elaboration, it is believed that one skilled in the art can, using the preceding description, utilize the present invention to its fullest extent. The following preferred specific embodiments are; therefore, to be construed as merely illustrative, and not limitative of the remainder of the disclosure in any way whatsoever. In the preceding text and the following examples, all temperatures are set forth uncorrected in degrees Celsius and all parts and percentages are by weight, unless otherwise indicated.

The melting points of the auxiliary dispersants utilized are listed in Table 3.

EXAMPLE 1

A 6 $m^3$ agitated autoclave is charged with 1,600 kg of 60° C. warm, demineralized water. Under agitation, 18 kg of Na alkylbenzenesulfonate (mixture of $C_{10}-C_{18}$-n-alkylbenzenesulfonates), 22 kg of a $C_{20}/C_{22}$-n-alkyl diethylene glycol ether, as well as 3.7 kg of monosodium phosphate are added thereto. After exclusion of air/oxygen, 1,800 kg of vinyl chloride is introduced. The mixture is set at 52° C., the agitator speed at 10 rpm. By metered feeding of a 0.5% strength $H_2O_2$ solution and of a 0.2% strength aqueous ascorbic acid solution, the reaction is started up. Further dosing of the catalyst components is adjusted so that the polymerization temperature of 52° C. remains constant at almost full cooling capacity (jacket: 600,000 kJ/h; reflux condenser: 120,000 kJ/h). The period from onset of reaction to pressure drop is about 6 hours.

The demonomerized dispersion is processed to polyvinyl chloride powder by way of a spray dryer. The conditions are set so that the oowder grain size contains only 2% by weight of particles >40 μm. In order to determine rheological behavior in a paste, respectively 100 parts of polyvinyl chloride and 60 parts of dioctyl phthalate are mixed and the paste viscosities measured after a storage period of 2 hours. All measured paste viscosities at $D=1$ $s^{-1}$ and 100 $s^{-1}$ are compiled in Table 1.

For testing the fogging values, the product is subjected to the following experiment:

The residual gloss of a glass plate is measured with a 60° reflectometer after exposing this glass plate to a fogging precipitate, as a yardstick for fogging. A 1-liter glass beaker having a planar bottom, a height of 190 mm and an external diameter of 90 mm and a ground rim is filled with 15 g of powdered PVC. The glass beaker is sealed with the aid of silicone rings and a specially cleaned 2 mm thick glass plate with the dimensions of 115 mm×115 mm and dipped into a bath thermostated to 90° C. From above, a cooling plate of 20° C. is placed on top of the glass plate over its entire area so that any possibly present volatile proportions of the powder, heated to 90° C., can condense on the glass plate that has been cooled to 20° C. After 6 hours, the glass plate is removed from the apparatus and the residual gloss of the glass plate (gloss of plate before beginning of test: 100%) is measured with a photoelectric gloss measuring device having a measuring head for a 60° angle of incidence and a 60° angle of exit. The gloss values of all measurements are compiled in Table 2.

EXAMPLE 2

A 6 m$^3$ agitated autoclave is charged with 1,600 l of demineralized water having a temperature of 60° C. Under agitation, 16.8 kg of myristic acid, 1.5 kg of sodium hydroxide solution, 200 g of sodium borohydride, 4 g of copper sulfate, and 18.3 kg of stearyl monoethylene glycol ether are introduced. After exclusion of air/oxygen, 1,800 kg of vinyl chloride is added. This mixture is set at a temperature of 42° C., the agitator speed is set at 10 rpm. The reaction is started up with a 0.5% aqueous $H_2O_2$ solution. Half an hour after onset of reaction, 100 kg of a 2.5% strength aqueous sodium hydroxide solution is added in metered amounts within 4 hours. The dispersion (solids content: 48%) is worked up as in Example 1. The pH value of the aqueous product extract is set at 5.0 with the aid of a 6% strength oxalic acid solution included during the spraying step in the nozzle sprayer (mode of operation in accordance with German Patent No. 2,531,780, Example 3). The paste viscosity, the paste including dioctyl phthalate in a ratio of 100:60, can be derived from Table 1.

The fogging value is determined as in Example 1. The result can be seen from Table 2. These two examples are embodiments of the invention conducted in the absence of an organic peroxide.

EXAMPLE 3

A 6 m$^3$ agitated autoclave is charged with 1,800 kg of demineralized water. To this are added 18 kg of alkylaryl sulfonate, 18 kg of stearyl diethylene glycol ether, 6.5 kg of dicetyl peroxydicarbonate, and 1,800 kg of vinyl chloride. This mixture is stirred at 25° C. for 15 minutes and subsequently forced into a 6 m$^3$ agitated autoclave by way of a homogenizer under a homogenizing pressure of 180 bar. In the autoclave, the reaction mixture is heated up to the polymerization temperature of 52° C. The polymerization period is about 12 hours. Working up of the dispersion (solids content 42%) takes place as in Example 1. Table 1 indicates the paste viscosity of the powder, made into a paste with dioctyl phthalate in a ratio of 100:60. The fogging value is determined as in Example 1. The result can be seen from Table 2.

EXAMPLE 4

A 6 m$^3$ agitated autoclave is charged with 1,250 kg of 52° C. warm, demineralized water. Under agitation, 17.5 kg of Na alkylbenzenesulfonate, 11 kg of stearyl diethylene glycol ether, 6 g of copper sulfate, 1 kg of tert-butyl perbenzoate are added thereto. After exclusion of air, the mixture is set at 43° C., the agitator speed at 10 rpm, and 2,200 kg of vinyl chloride is introduced. By metered feeding of a 0.2% aqueous ascorbic acid solution, the reaction is started up and further metered feeding is executed so that, with constant polymerization temperature of 43° C., the cooling capacity of jacket cooler and reflux condenser is almost completely exploited. The period from onset of reaction to pressure drop is 6 hours. The dispersion (solids content 59.5%) is worked up in correspondence with Example 1. The paste viscosity can be derived from Table 1, the fogging value from Table 2.

EXAMPLE 5

Example 4 is repeated except for maintaining the temperature at 52° C. during polymerization in order to adjust the K-value to 70. The dispersion (solids content: 60.0%) is worked up corresponding to Example 1. The paste viscosity can be seen from Table 1, the fogging value from Table 2.

EXAMPLE 6

A 6 m$^3$ agitated autoclave is charged with 1,250 kg of 60° C. warm, demineralized water. Under agitation, 17.5 kg of Na alkylbenzenesulfonate, 11 kg of $C_{20/22}$-alkyl dipropylene glycol ether, and 6 g of copper sulfate are added. After exclusion of air, the mixture is set at 52° C., the agitator speed at 10 rpm, and 2,200 kg of vinyl chloride is added. The reaction is started up by the metered feeding of an aqueous 0.2% strength ascorbic acid solution and a 0.5% strength $H_2O_2$ solution, and the metered feeding into the solution is continued so that the cooling capacity of the jacket cooler and reflux condenser is almost completely utilized at a constant polymerization temperature of 52° C. The time from onset of reaction to pressure drop is 6 hours. The dispersion (solids content: 56.0%) is worked up in correspondence with Example 1. The paste viscosity can be derived from Table 1, the fogging value from Table 2.

COMPARATIVE EXAMPLE A

A 6 m$^3$ agitated autoclave is charged with 1,600 kg of 60° C. warm, demineralized water. Under agitation, 16.7 kg of myristic acid, 1.5 kg of sodium hydroxide solution, and 16.3 kg of stearyl alcohol, 4 g of copper sulfate, and 200 g of sodium borohydride are introduced. After exclusion of air/oxygen, 1,800 kg of vinyl chloride is added. The mixture is set at a temperature of 43° C., the agitator speed at 10 rpm. The reaction is started up and controlled by the metered feeding of a 0.5% strength $H_2O_2$ solution. Half an hour after beginning of the reaction, 100 l of 2% strength sodium hydroxide solution is fed in metered quantities into the reactor. The time from beginning of reaction to pressure drop is 6 hours. The dispersion (solids content 49.9%) is worked up in accordance with Example 1. The paste viscosity can be seen from Table 1, the fogging value from Table 2.

Comparative Example B

The test proceeds as described in Comparative Example A, except for using lauryl alcohol in place of stearyl alcohol. The dispersion (solids content 37.1%) is worked up as described in Exampl 1. The paste viscosity can be derived from Table 1, the fogging value from Table 2.

COMPARATIVE EXAMPLE C

The process is conducted in this test as cited in Example 1, except for using stearyl alcohol in place of a $C_{20}/C_{22}$-alkyl diethylene glycol ether. The dispersion (solids content: 46%) is worked up as set forth in Example 1. The paste viscosity can be seen from Table 1, the fogging value from Table 2.

COMPARATIVE EXAMPLE D

The procedure of Example 6 is followed, but using the $C_{20}/C_{22}$-alcohol instead of the $C_{20}/C_{22}$-alkyl dipropylene glycol ether. A large quantity of coagulate is obtained (solids content of dispersion: 26.4%).

TABLE 1

Paste Viscosities PVC/DOP = 100/60

| Example/ Comp. Example | (dPa s) | |
| --- | --- | --- |
|  | $D = 1\ s^{-1}$ | $D = 100\ s^{-1}$ |
| 1 | 43 | 40 |
| 2 | 45 | 40 |
| 3 | 25 | 23 |
| 4 | 43 | 33 |
| 5 | 39 | 30 |
| 6 | 35 | 30 |
| A | 220 | 100 |
| B | Not Measurable | |
| C | 45 | 39 |
| D | 155 | 108 |

TABLE 2

Fogging Test

| Example/ Comp. Example | Gloss (%) |
| --- | --- |
| 1 | 87 |
| 2 | 82 |
| 3 | 81 |
| 4 | 89 |
| 5 | 87 |
| 6 | 91 |
| A | 71 |
| B | 33 |
| C | 65 |
| D | 81 |

TABLE 3

Melting Point of Auxiliary Dispersants

| Auxiliary Dispersant | mp (°C.) |
| --- | --- |
| Lauryl Alcohol ($C_{12}$) | 24 |
| $C_{16/18}$-Alcohol | 51–52 |
| $C_{20/22}$-Alcohol | 60 |
| $C_{16/18}$-Alcohol + 1 EO | 41 |
| $C_{16}$-Alcohol + 1 EO, Distilled, Purity 99% | 41 |
| $C_{16/18}$-Alcohol + 2 EO | 37 |
| $C_{20/22}$-Alcohol + 2 PO | 49 |

As demonstrated by the examples, the pastes produced with the polyvinyl chloride prepared in accordance with this invention exhibit completely surprisingly an almost Newtonian fluid characteristic with a simultaneously very low viscosity. The finished articles made from polyvinyl chloride produced according to the invention are distinguished by an especially low fogging.

What is claimed:

1. In a process for the production of an aqueous latex of paste forming homopolymers of vinyl chloride or copolymers of mixtures of vinyl chloride and up to 30% by weight of polymerizable monomers, by discontinuous polymerization in the presence of water, water soluble or monomer-soluble catalyst, anionic emulsifier and auxiliary dispersant, the improvement comprising utilizing as said auxiliary dispersant an alcohol glycol ether of the general formula $$R-O(-CH_2-CHO)_{\overline{n}}H$$
$$\quad\quad\quad\quad\quad\ \ R_1$$

wherein R is an alkyl moiety of 16–22 carbon atoms or an alkylphenyl moiety of 18–22 carbon atoms, $R_1$ is hydrogen or an alkyl moiety of 1–2 carbon atoms, and n is a number of 1 to 3.

2. A process according to claim 1 wherein a predispersion is formed comprising the anionic emulsifier, the auxiliary dispersant and at least a fraction of the aqueous phase required for polymerization; and thereafter the remaining components necessary for production of the polymers are added to the formed predispersion.

3. A process according to claim 1, wherein a predispersion is formed comprising the anionic emulsifier, the auxiliary dispersant and a monomer-soluble catalyst, together with at least a fraction of the aqueous phase required for polymerization; and thereafter the monomer is added.

4. A process according to claim 1 wherein a mixture comprising the anionic emulsifier, the auxiliary dispersant, the catalyst, at least a fraction of the aqueous phase required for polymerization, and at least a fraction of the monomer is homogenized.

5. A process according to claim 1, wherein a mixture comprising the anionic emulsifier, the auxiliary dispersant, and optionally water is added to the polymerization charge in a batch or continuous fashion during the polymerization process.

6. A process according to claim 2, wherein the predispersion is prepared by utilizing 30–80 wt % of the total amount of anionic emulsifier required, and is added to the polymerization charge and the emulsifier, or a component which forms the emulsifier during polymerization, is added in metered amounts, either batchwise or continuously, as an aqueous solution to the polymerization mixture after a conversion of 10–60 weight % of the initial charge has been achieved.

7. A process according to claim 3, wherein the predispersion is prepared by utilizing 30–80% by weight of the total amount of anionic emulsifier required, and is added to the polymerization charge, while the emulsifier, or an emulsifier forming component is added in metered amounts, in either batch or continuous fashion, as an aqueous solution to the polymerization mixture, after a conversion of 10–60 weight % of the initial polymerization charge has been reached.

8. A process of claim 3 wherein the predispersion is prepared by means of a homogenizer.

9. A process according to claim 1, wherein n is either 1 or 2.

10. A process according to claim 1 wherein said process is conducted in the absence of an organic peroxide.

11. A process according to claim 1, wherein $R_1$ is hydrogen.

12. A process according to claim 1, wherein $R_1$ is methyl.

13. A process according to claim 1, wherein the alcohol glycol ethers utilized in the auxiliary dispersants are formed by reacting with 1–3 moles of ethylene oxide, 1,2-propylene oxide, or 1,2-butylene oxide.

14. A process according to claim 1, wherein the auxiliary dispersant is present in an amount of 0.05–2.5% by weight, based on the vinyl chloride monomer.

15. A process according to claim 1, wherein the anionic emulsifier is an alkali metal or ammonium salt of a fatty acid, alkylsulfonic acid, alkylarylsulfonic acid, sulfosuccinic acid ester, or fatty alcohol sulfate.

16. A process according to claim 1, wherein the melting point of the auxiliary dispersant is about 10° C. or more below the polymerization temperature.

17. A process according to claim 1, wherein copolymers having up to 30 wt % comonomer are formed.

18. A process according to claim 1, wherein the auxiliary dispersant is present in an amount of 0.1–2.0% by weight, based on the vinyl chloride monomer.

19. A process according to claim 1 wherein said polymerization is conducted in an aqueous microsuspension.

20. A process according to claim 1, wherein said polymerization is conducted in an aqueous emulsion.

* * * * *